United States Patent [19]

Agerhall et al.

[11] 4,096,471
[45] Jun. 20, 1978

[54] METHOD AND APPARATUS FOR TRANSFER OF ASYNCHRONOUSLY CHANGING DATA WORDS

[75] Inventors: Kurt Roland Agerhall, Handen; Yngve Allan Sundblad, Norsborg, both of Sweden

[73] Assignee: Telefonaktiebolaget L M Ericsson, Stockholm, Sweden

[21] Appl. No.: 745,109

[22] Filed: Nov. 26, 1976

[30] Foreign Application Priority Data

Dec. 22, 1975 Sweden .................................. 7514508

[51] Int. Cl.² .................................................. G06F 11/00
[52] U.S. Cl. ................................. 340/146.1 R; 364/900
[58] Field of Search ........................ 364/900 MS File; 340/146.1 R, 146.1 AB

[56] References Cited

U.S. PATENT DOCUMENTS

| 3,051,929 | 8/1962 | Smith | 340/172.5 |
| 3,209,332 | 9/1965 | Doersam | 340/172.5 |

*Primary Examiner*—Jerry Smith
*Attorney, Agent, or Firm*—Hane, Roberts, Spiecens & Cohen

[57] ABSTRACT

A method and an apparatus for transferring asynchronously changing data words which gives protection against misinterpretation if the data changes during the transfer interval provides an indication signal for a certain period of time in connection with the occurrence of a data change, the positioning of this period of time is chosen such that the indication signal will be transferred in addition to the data word when the data alteration time falls within the transfer interval.

5 Claims, 2 Drawing Figures

METHOD AND APPARATUS FOR TRANSFER OF ASYNCHRONOUSLY CHANGING DATA WORDS

The present invention relates to a method and apparatus for transferring asynchronously changing data words which provides protection against misinterpretation if the data changed during the transfer interval.

Data being transferred, for example, to a computer from a binary counter which is stepped asynchronously in relation to the computer may be distorted if the computer performs a read operation at the same time as the binary counter is stepped. Furthermore, if data cannot be transferred during only one read operation, but requires for example four read operations there is an increased risk that the data will be altered between the readings. This problem is normally remedied by a backwardly directed supervisory signal which is emitted by the computer during the entire transfer interval and is utilized to prevent the data from being altered during the transfer interval. The drawbacks with this method are, on the one hand, that sometimes it may be difficult to arrange such a backward supervisory signal, and, on the other hand, that often it is difficult to influence the data changing time. In order to avoid the backward supervisory signalling one may alternatively permit each read operation to include several read-outs whose results are compared with each other to reveal any possible change of the data. The drawback of this method is the considerable increase of the computer load.

An object of the invention is to enable detection and exclusion of distorted data words by use of an indication signal which is generated in connection with the alteration instant, whereby the above drawbacks are eliminated. The characteristics of the invention appear from the appended claims.

The invention is described in the following by means of an embodiment and with reference to the accompanying drawing where:

Figure 1:
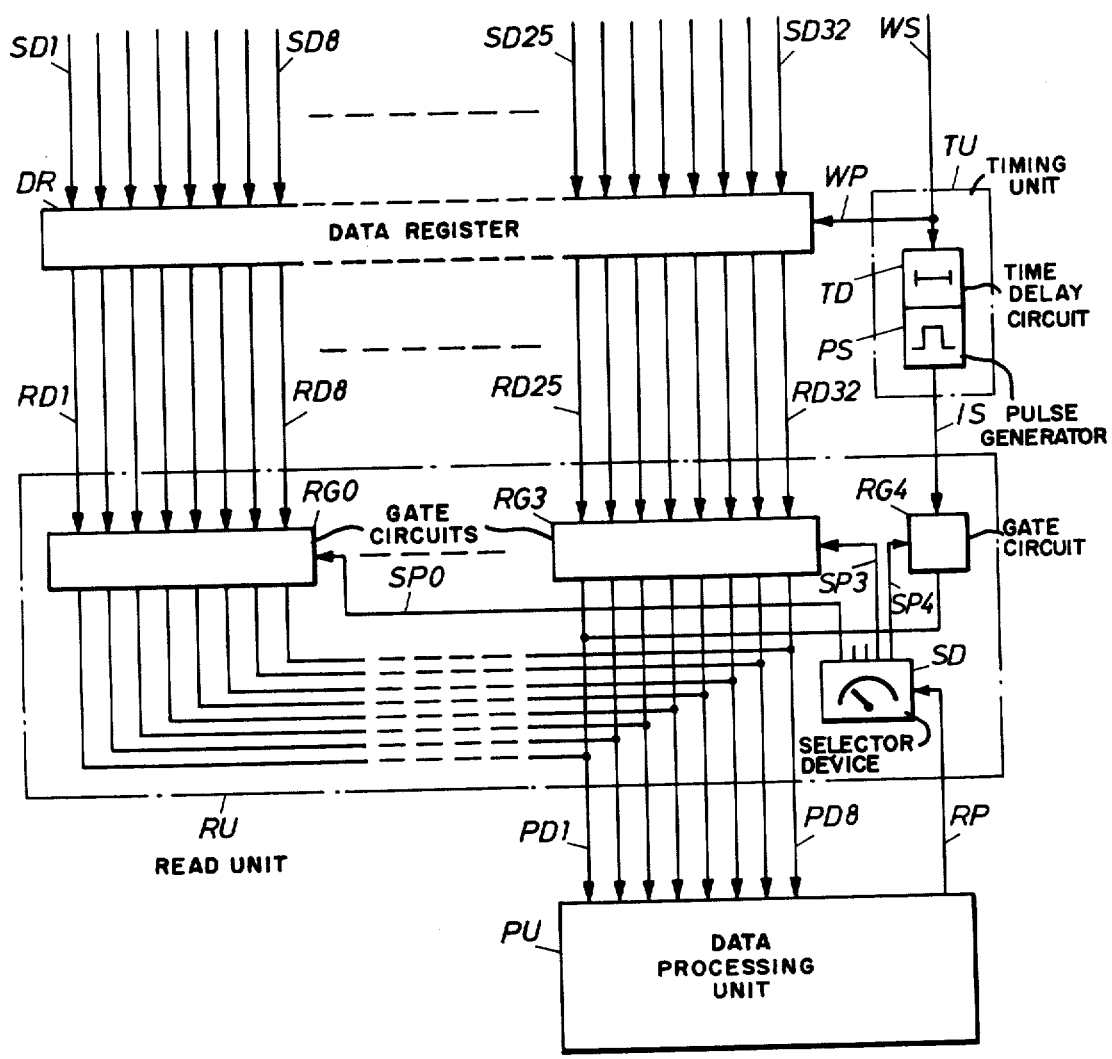
FIG. 1 shows a block diagram of an apparatus according to the invention.

In FIG. 1 there is a data register for the recording of a 32-bit data word in correspondence to the data signals which arrive on the leads SD1-SD32 simultaneously with a write signal on lead WS which is fed to the timing unit TU. The data word is registered by means of a write pulse on lead WP and forwarded via leads RD1-RD32 to a read unit RU which furthermore receives an indication signal on lead IS from the timing unit TU. Finally, PU designates a data processing unit which, by means of read pulses on line RP, receives the data word via the read unit RU and leads PD1-PD8. Since the number of incoming lines or circuits to the read unit RU is larger than the number of outgoing lines or circuits from the unit, several read operations, in this case four, are required to transfer the data word in the data register DR to the data processing unit PU and an additional read operation is required to transfer the information on circuit IS via anyone of the circuits PD1-PD8. The read unit RU contains gate circuits RG0-RG4 connected between incoming and outgoing circuits and a selector device SD which, concurrently with the read pulses on circuit RP, sequentially activates each gate circuit by means of selection pulses on the circuits SP0-SP4 so that the circuits RD1-32, in groups of eight, are through-connected to the circuits PD1-8 and circuit IS is through-connected, separately, to circuit PD1. The information on circuit IS may for example be transferred at the first reading, after which information on the circuits RD1-8 is transferred at the second reading, information on circuits RD9-16 at the third and so on. Another possibility is to transfer the information on circuit IS during the last reading, the information on circuits RD1-32 being transferred at the first four readings. Finally, the information on circuit IS may be transferred at one of the readings two through four, i.e. interleaved with the other readings. However, independently of when the circuit IS is read, an indication signal must be transferred via this circuit from the timing unit TU to the data processing unit PU in order to indicate that a data change occurs in the register DR during the time interval when the four readings concerning the circuits RD1-32 continues. To enable this, the indication signal must be available for a period of time which is at least as long as the transfer interval for the data word and this period must be placed in relation of the transfer interval with consideration to the transfer sequence.

Figure 2:
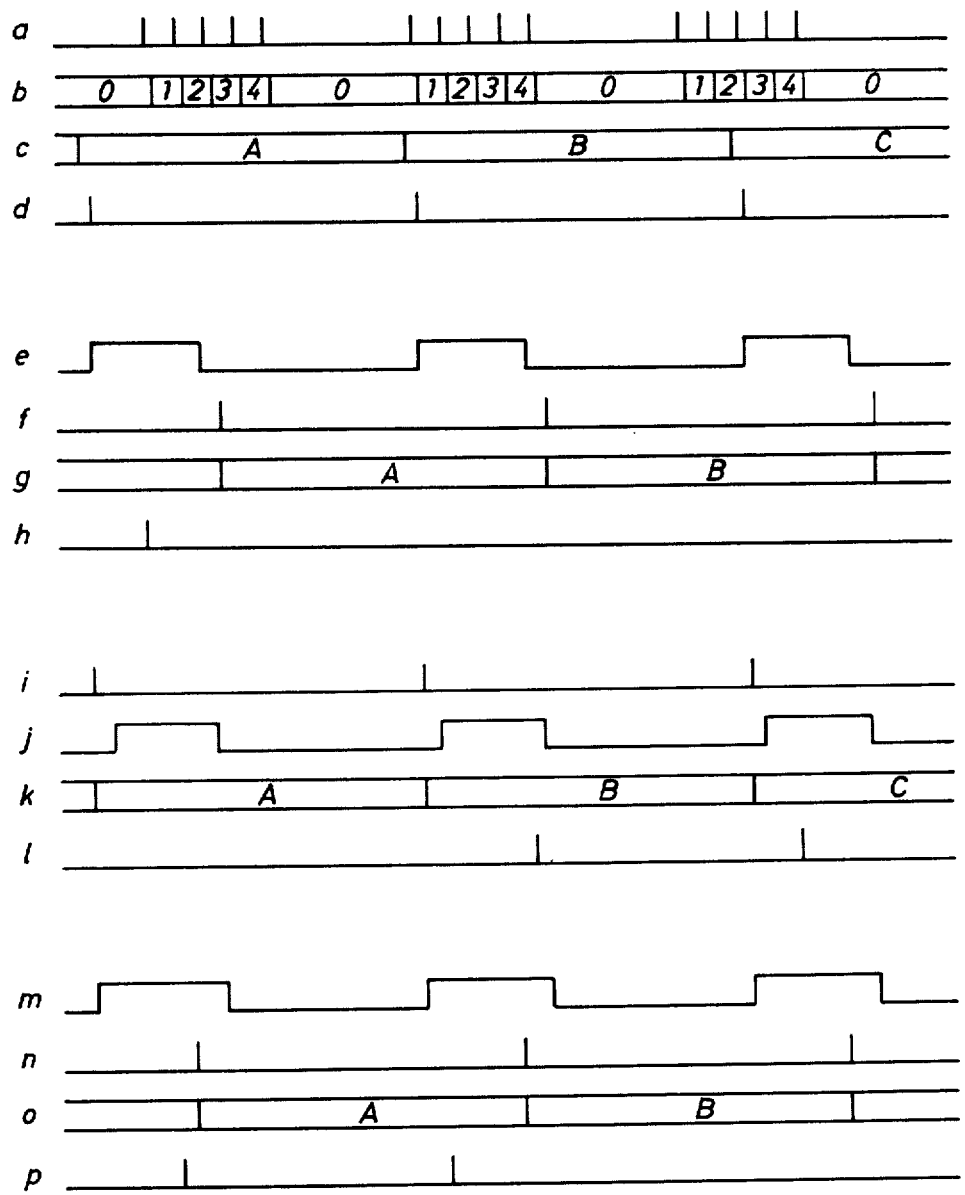
FIG. 2 shows a number of timing diagrams which illustrate the operation of the apparatus.

On lines $a$ and $b$ of FIG. 2 the operation of the read unit RU is illustrated. The pulses on line $a$ correspond to the read pulses on circuit RP from the data processing unit PU. As shown, the pulses appear in groups of five, corresponding to the above described read operations. At each of the read operations, that group of circuits on the input side of the reading unit RU is read which, in correspondence to the position of the selector device SD, is through-connected by the respective gate circuit RG0-RG4, in accordance with the numbering 0-4 on line $b$ of FIG. 2. After each reading a switch-over is made to the gate circuit having the next higher number. After the reading in position 4, a switch-back is made to position 0 which remains until the next read cycle begins. Line $c$ in FIG. 2 shows the condition changes on the data circuits SD1-SD32, and line $d$ shows the write signals received on circuit WS, which signals occur immediately after each condition change on the data circuits.

According to the preceding, one of three alternatives may be chosen for reading the information on circuit IS. The first one of these alternatives is that circuit IS is read in position 0 which means that the information which is transferred in that position is to inform the data processing unit PU whether or not a data change occurs during the transfer interval in the positions 1-4. The timing unit TU is assumed to be designed so that it initiates an indication signal according to line $e$ at the same time as the unit receives the write signal according to line $d$. If it is assumed that the reading in position 0 takes place immediately before the start of the indication signal, i.e. before the positive going transition, the information on circuit IS states that no data change takes place during the transfer interval in positions 1-4. Consequently, the write pulse WP emitted from the unit TU must be delayed so much that the transfer interval is included and thus it obtains, for example, the position which is shown on line $f$. If, instead, it is assumed that the transfer interval is started immediately before the alteration instant according to line $f$ it is obvious that the indication signal must be ended, as a maximum, one read pulse interval before the alteration instant as shown on line $e$. Thus, the indication signal must always be available for a period which is at least as long as the transfer interval of the read pulses in the four positions 1-4, i.e.

at least three read pulse intervals. On line g there is shown the condition changes on circuits RD1-32 as a consequence of the write pulses on circuit WP, and on the line h there is shown a pulse which indicates the point of time when coincidence has occurred between a read pulse in position 0 and the indication signal which, consequently, states that a data change has occurred during the transfer interval.

As a second alternative, the information on circuit IS may be read in position 4 while the transfer interval for the data circuits RD1-32 is placed in positions 0-3. In this case it is assumed that the timing unit TU is so designed that it emits a write pulse on circuit WP to the data register DR at the same time as it receives a write signal on circuit WS. This is shown on line i in FIG. 2. A data transfer interval which ends immediately after the alteration instant is to be followed by an indication signal and therefore the positive going transition of this signal must lie on a distance of maximally one read pulse interval after the alteration instant, for example as shown on line j in FIG. 2. The indication signal will, in principle, have the same length as in the preceding alternative. The condition changes on circuits RD1-32 are shown on line k and on line l there have been indicated the instants when coincidence arises between a read pulse in position 4 and the indication signal.

According to the third alternative finally, the indication signal is, for example, read in position 1, while the data circuits are read in positions 0, 2, 3 and 4. In this case it is suitable to let the timing unit TU initiate the indication signal at the same time as the write signal is received on circuit WS. As is shown on line m, the time period for the indication signal must now be a read pulse interval longer because the read pulse for the indication signal is interspersed with the data transfer interval. On lines n, o and p are shown, in the same manner as before, the time positions of the write pulses on circuit WP, the condition changes on circuits RD1-32 and the coincidences between the read pulses in position 1 and the indication signals.

The part which is essential for carrying out the invention in the above described apparatus is the timing unit TU which mainly contains two time measuring devices. One of these devices establishes the length of the indication signal period and the other establishes the position of the period in relation to the data alteration instant, i.e. the instant when the write pulse occurs on circuit WP. The embodiment according to FIG. 1 corresponds to the above-described second alternative for the reading sequence, i.e. that the data signals are read in position 0-3 while the indication signal is read in position 4. According to FIG. 2, lines d and i, the write pulse on circuit WP is simultaneous with the write signal on circuit WS, hence, as shown in FIG. 1, the circuits may be directly connected to each other. The device TD is a time delay circuit which forwards the signal on circuit WS to the device PS with a delay of maximally one read pulse interval. The device PS then generates a pulse with a duration of at least three read pulse intervals as indicated on line j in FIG. 2. The time measuring devices may be of either the analogue or the digital type depending on the required accuracy. The circuit technique is known per se.

We claim:

1. In apparatus where data words which change asynchronously are transferred during transfer intervals to a data word receiver, each of said transfer intervals having a sampling instant associated therewith during which the data word receiver operates to determine whether a data word changes during the associated transfer interval, the method of indicating to the data word receiver whether a data word changes during a transfer interval comprising the steps of generating a first signal for each data word change, said first signal having a duration at least as long as a transfer interval, timing the generation of said first signal relative to the time of occurrence of a data word change is in accordance with the occurrence of the sampling instant relative to its transfer interval, and sampling for the presence of said first signal at a particular instant predetermined with respect to the transfer intervals to give a signal whenever a data word changes during the then occurring transfer interval.

2. The method according to claim 1 wherein the presence of said first signal is sampled before the occurrence of the associated transfer interval and precedes the associated data word change.

3. The method according to claim 1 wherein the presence of said first signal is sampled after the occurrence of the associated transfer interval and follows the associated data word change.

4. The method according to claim 1 wherein said first signal is sampled within the associated transfer interval and a given period of time before the end thereof, and the start of said first signal occurs said given period of time before the occurrence of the instant of change of the associated data word.

5. In apparatus wherein data words which change asynchronously are transferred during transfer intervals to a data word receiver, apparatus for indicating whether a data word has changed during a transfer interval comprising: sequencing means for setting a sampling period associated with each transfer interval; and a timing unit which is activated each time a data word change occurs for generating an indication signal, said timing unit including signal generator means for generating the indication signal having a duration at least equal to the duration of a transfer interval and timing means for controlling the indication signal to be present during said sampling period whenever a data word change occurs within the associated transfer interval.

* * * * *